(12) United States Patent
Kim et al.

(10) Patent No.: US 11,398,222 B2
(45) Date of Patent: Jul. 26, 2022

(54) ARTIFICIAL INTELLIGENCE APPARATUS AND METHOD FOR RECOGNIZING SPEECH OF USER IN CONSIDERATION OF USER'S APPLICATION USAGE LOG

(71) Applicant: LG ELECTRONICS INC., Seoul (KR)

(72) Inventors: Jaehong Kim, Seoul (KR); Boseop Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 16/539,773

(22) Filed: Aug. 13, 2019

(65) Prior Publication Data
US 2019/0371297 A1 Dec. 5, 2019

(30) Foreign Application Priority Data
Jul. 22, 2019 (KR) .......................... 10-2019-0088516

(51) Int. Cl.
*G10L 15/06* (2013.01)
*G10L 15/183* (2013.01)
(Continued)

(52) U.S. Cl.
CPC ............ *G10L 15/063* (2013.01); *G06F 17/16* (2013.01); *G10L 15/16* (2013.01); *G10L 15/183* (2013.01)

(58) Field of Classification Search
CPC ..... G10L 15/063; G10L 15/16; G10L 15/183; G10L 15/06; G10L 15/18; G10L 15/187;
(Continued)

(56) References Cited

U.S. PATENT DOCUMENTS

| 6,125,347 A * | 9/2000 | Cote ...................... G10L 15/26 704/270 |
| 2005/0131589 A1 * | 6/2005 | Yamamura ............ B60W 10/18 701/1 |

(Continued)

FOREIGN PATENT DOCUMENTS

| CN | 108665890 A * | 10/2018 | .......... G10L 15/063 |
| KR | 20170030387 | 3/2017 | |

(Continued)

OTHER PUBLICATIONS

Korean Intellectual Property Office Application Serial No. 10-2019-0088516, Office Action dated Nov. 29, 2020, 6 pages.
(Continued)

*Primary Examiner* — Huyen X Vo
*Assistant Examiner* — Darioush Agahi
(74) *Attorney, Agent, or Firm* — Lee Hong Degerman Kang & Waimey

(57) ABSTRACT

Provided is an artificial intelligence (AI) device for recognizing speech of user. The AI apparatus includes: a microphone; and a processor configured to: receive, via the microphone, a sound signal corresponding to speech of the user, recognize the speech from the sound signal using a language model, determine an intention of the user based on the recognition result, determine whether the determination of the intention is successful, obtain a user's application usage log if the determination of the intention is not successful, and update the language model using the obtained user's application usage log.

11 Claims, 9 Drawing Sheets

(51) Int. Cl.
*G10L 15/16* (2006.01)
*G06F 17/16* (2006.01)

(58) Field of Classification Search
CPC . G10L 2015/0631; G10L 15/02; G10L 15/04; G10L 15/1822; G10L 2015/226; G10L 21/02; G06F 17/16; G06F 17/17; G06N 3/08
See application file for complete search history.

(56) References Cited

U.S. PATENT DOCUMENTS

| | | | | |
|---|---|---|---|---|
| 2005/0240620 | A1* | 10/2005 | Danner | G06F 16/986 |
| 2013/0227352 | A1* | 8/2013 | Kumarasamy | G06F 11/1461 714/47.1 |
| 2014/0250147 | A1* | 9/2014 | Shapira | G06F 3/0482 707/770 |
| 2014/0372401 | A1* | 12/2014 | Goldstein | G10L 25/54 707/706 |
| 2015/0370787 | A1* | 12/2015 | Akbacak | G06F 40/47 704/2 |
| 2016/0071517 | A1* | 3/2016 | Beaver | G10L 15/22 704/9 |
| 2017/0069314 | A1 | 3/2017 | Mun | |
| 2018/0182386 | A1* | 6/2018 | Lee | G10L 15/183 |
| 2018/0286401 | A1* | 10/2018 | Oh | G10L 15/063 |
| 2020/0074993 | A1 | 3/2020 | Lee et al. | |
| 2020/0243066 | A1* | 7/2020 | Je | G10L 13/08 |
| 2020/0335095 | A1* | 10/2020 | Yuan | G10L 15/1815 |

FOREIGN PATENT DOCUMENTS

| | | |
|---|---|---|
| KR | 20180068850 | 6/2018 |
| KR | 20180071931 | 6/2018 |

OTHER PUBLICATIONS

Choi, et al., "An Intention Prediction Method for Dialogue using Paragraph Vector," The Korean Institute of Information Scientists and Engineers, Jun. 2016, pp. 977-979, 5 pages.

* cited by examiner

ARTIFICIAL INTELLIGENCE APPARATUS AND METHOD FOR RECOGNIZING SPEECH OF USER IN CONSIDERATION OF USER'S APPLICATION USAGE LOG

CROSS-REFERENCE TO RELATED APPLICATIONS

Pursuant to 35 U.S.C. § 119(a), this application claims the benefit of earlier filing date and right of priority to Korean Patent Application No. 10-2019-0088516, filed on Jul. 22, 2019, the contents of which are hereby incorporated by reference herein in its entirety.

BACKGROUND

The present invention relates to an artificial intelligence apparatus and a method for recognizing speech of a user in consideration of a user's application use. Specifically, the present invention relates to an artificial intelligence apparatus and a method for recognizing speech of a user more accurately by additionally considering a user's application use in a situation where the speech of the user is not correctly recognized.

Recently, the number of devices that interact with users using speech recognition are increasing. A speech recognition technology has been applied to various services such as a speech-to-text (STT) service that simply converts user's speech into text, a service that performs appropriate control or provides a response when the user's speech is input, or the like.

However, when the user's speech is not recognized correctly, these devices will only ask the user to utter again, which causes a user's satisfaction level to drop significantly.

In addition, the speech that has failed to be recognized once is often not recognized correctly even after the reutterance. In this case, the user will not use the speech recognition function without explicit feedback, which makes it difficult to improve a performance of the speech recognition function.

SUMMARY

A purpose of the present invention is to provide an artificial intelligence (AI) apparatus and a method for improving a speech recognition performance using an application usage log of a user as feedback when speech of the user is not correctly recognized.

Further, another purpose of the present invention to provide an AI apparatus and a method for updating a language model used for speech recognition in consideration of reliability of intention determination.

In a first aspect, there is provided an AI apparatus and a method for recognizing speech of a user using a language model, determining an intention of the user based on the recognition result, obtaining a user's application usage log when the determination of the intention is not successful, and updating the language model using the obtained application usage log.

In a second aspect, there is provided an AI apparatus and a method for determining an intention of recognized speech of a user using an intention classifier and calculating reliability of the intention determination based on a relationship with locations of intention groups in a vector space projected by the intention classifier to determine whether to update a language model.

According to various embodiments of the present invention, even when the speech of the user is not correctly recognized and the user does not provide explicit feedback, the speech recognition performance may be improved using the user's application usage log as an implicit feedback.

Further, according to various embodiments of the present invention, user's specific pronunciation, user's specific language usage habit, dialect, or the like may be reflected to improve the speech recognition model.

DETAILED DESCRIPTIONS

Figure 1:
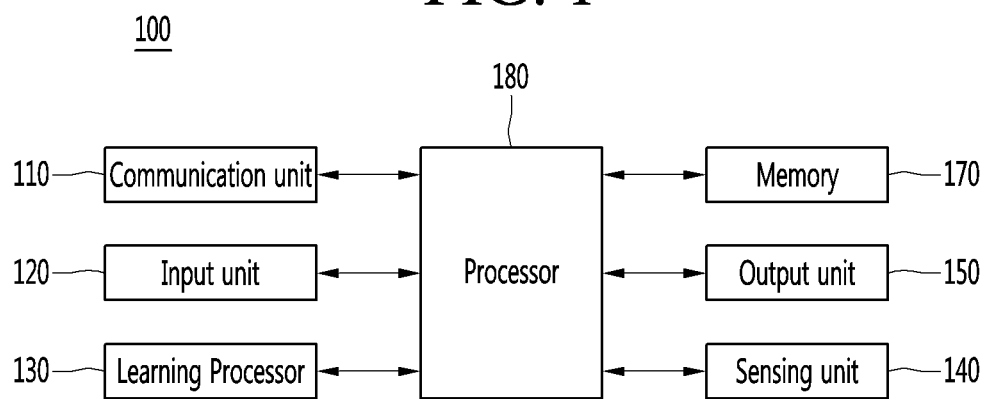
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
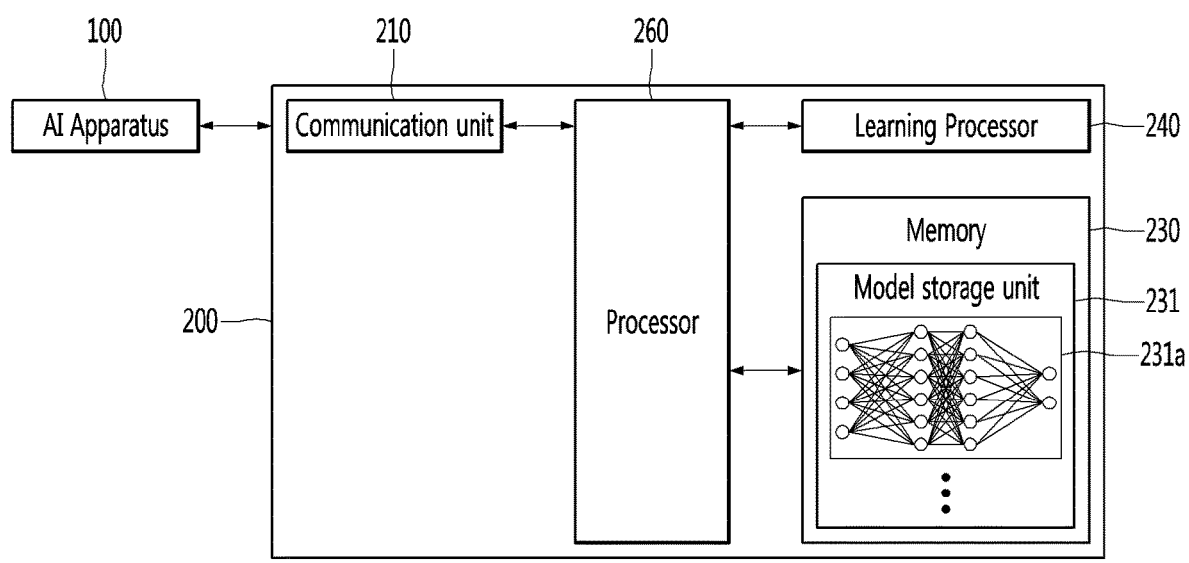
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
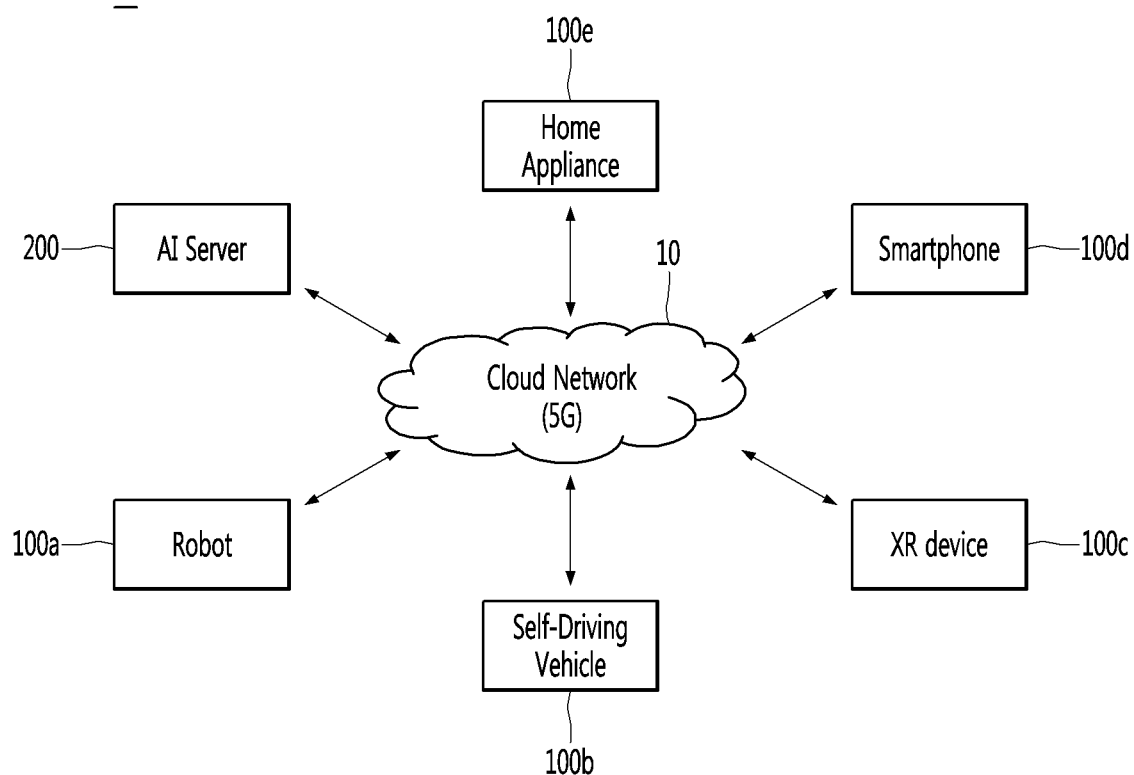
FIG. 3 is a diagram illustrating an AI system according to an embodiment of the present invention.

FIG. 3 is a diagram illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, or the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
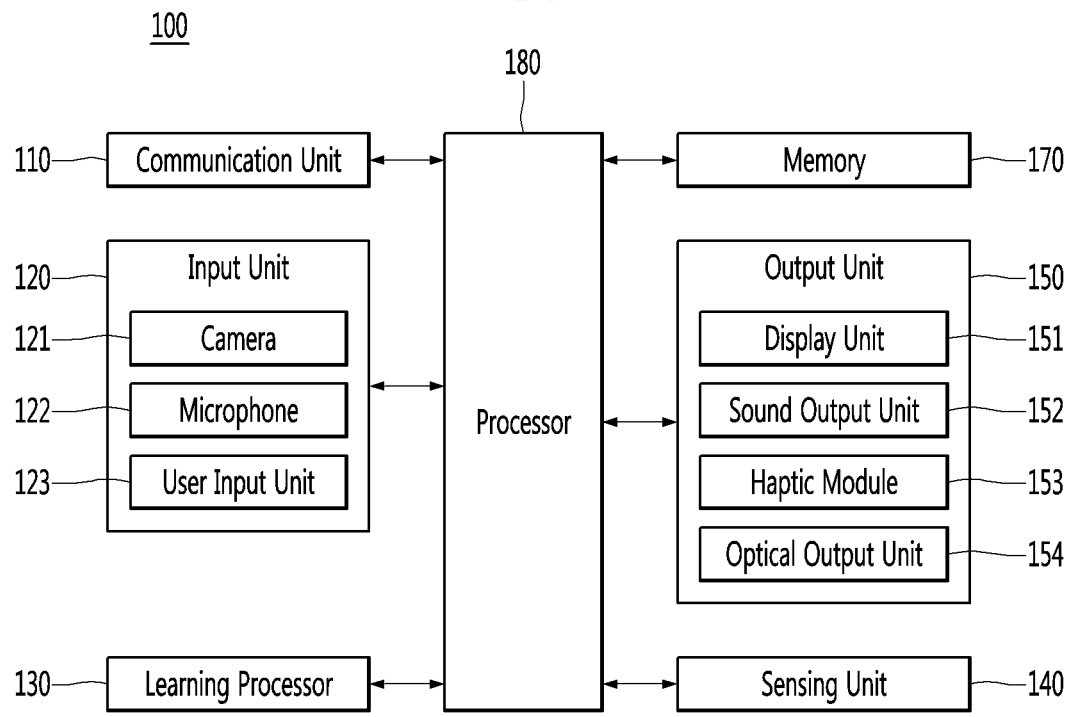
FIG. 4 is a block diagram illustrating an AI apparatus according to an embodiment of the present invention.

FIG. 4 is a block diagram illustrating an AI apparatus according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

A sensing unit 140 may be called a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
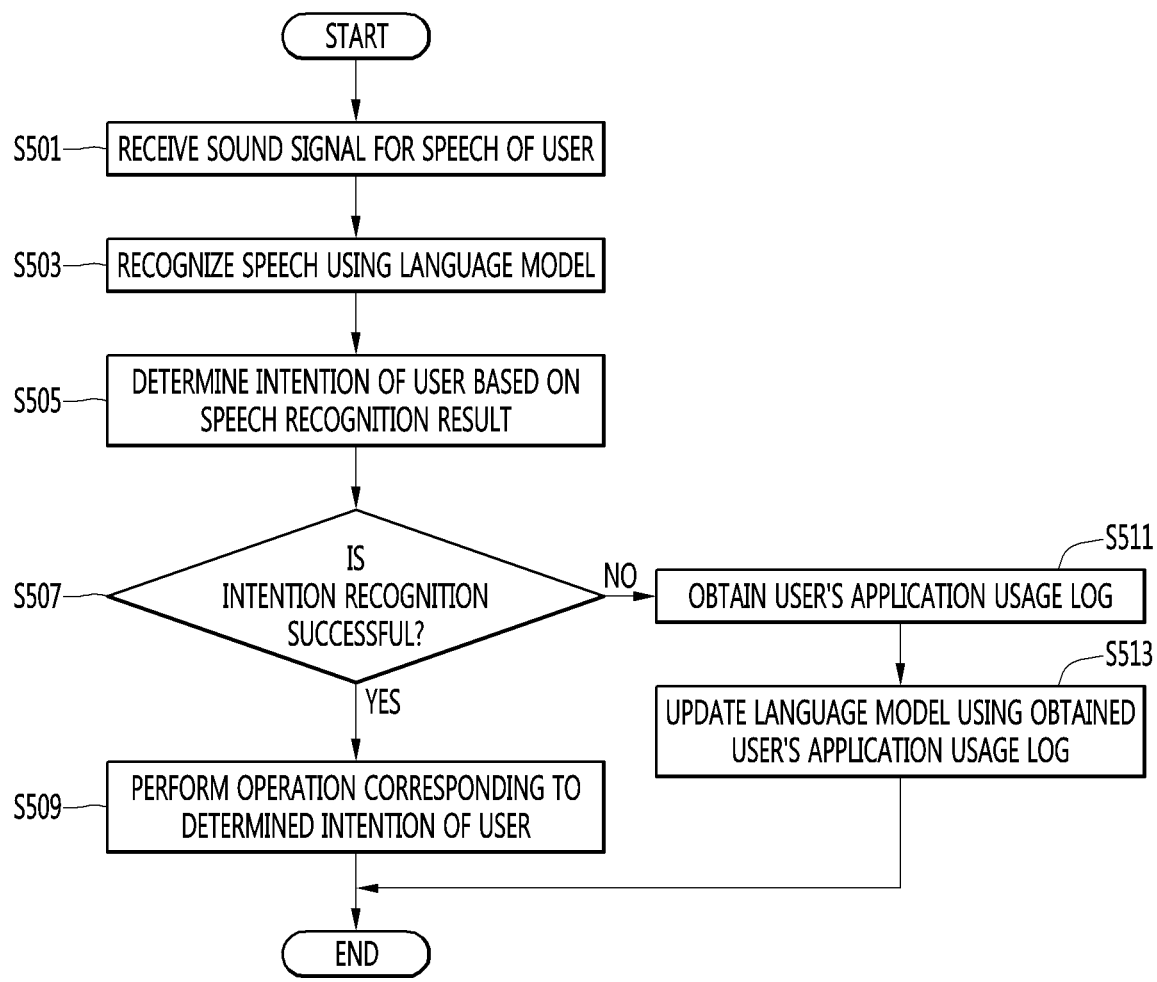
FIG. 5 is a flowchart illustrating a method for recognizing speech of a user in consideration of user's application usage according to an embodiment of the present invention.

FIG. 5 is a flowchart illustrating a method for recognizing speech of a user in consideration of user's application usage according to an embodiment of the present invention.

Referring to FIG. 5, the processor 180 of the AI apparatus 100 receives a sound signal for the speech of the user (S501).

The sound signal of the user's speech may be received via the microphone 121 of the AI apparatus 100, but may also be received from an external device (not shown) via the communication unit 110.

The sound signal may be an audio file in a pulse code modulation (PCM) format.

Then, the processor 180 of the AI apparatus 100 recognizes the speech using a language model (LM) (S503).

Here, the recognizing of the speech may mean generating a text string corresponding to the sound signal.

The processor 180 may recognize the input sound signal on a phoneme basis using an acoustic model (AM) and may determine a word corresponding to the input sound signal based on the recognition result on a phoneme basis. The processor 180 may generate a word vector on a phoneme basis using the recognition result on a phoneme basis and determine at least one word corresponding to the input sound signal using the generated word vector on a phoneme basis and the language model.

The at least one word determined by the processor 180 may include a single word or a word sequence composed of a plurality of words.

The language model may refer to a model that represents a probability distribution for the word sequence. That is, when a specific word sequence is given, the language model may output a probability that the word sequence appears. Thus, the processor 180 may use the language model to determine candidate words suitable for a next word when a specific word sequence is given or to calculate a probability that each candidate word appears.

For example, it is assumed that the processor 180 recognizes phonemes of a specific recognition target word as ['n', 'i', 'g', 'h', 't'] using the acoustic model. The processor 180 may generate a word vector on a phoneme basis corresponding to the ['n', 'i', 'g', 'h', 't'] and determine the recognition target word using the generated word vector and the language model. When the language model is used, and when it is determined that the recognition target word is more likely to be a "knight" than a "night" in view of the word sequence recognized so far, the processor 180 may determine the target word to be the "knight" rather than the "night", unlike the result of the acoustic model.

Although the above example describes a situation where only a single word is determined, the present invention is not limited thereto. That is, the processor 180 may determine a single word using word vectors on a phoneme basis estimated to be a plurality of words, or conversely, determine a plurality of words using a word vector on a phoneme basis estimated to be a single word.

For example, even when the recognition result on a phoneme basis from the acoustic model indicates a single word "foreign", the recognition target word may be determined as a plurality of words "for him". On the contrary, even when the recognition result on a phoneme basis from the acoustic model indicates the plurality of words "for him", the recognition target word may be determined as the single word "foreign" based on the determination result of the language model.

In addition, the processor 180 may recognize a word based on the recognition result on a phoneme basis of the acoustic model and calculate an LM score of the language model for the recognized word. Further, when the LM score of the recognized word is below a certain level, the processor 180 may find a word similar to the recognized word but has a higher LM score from a lexicon and determine the found word to be a recognition result.

That is, the processor 180 may recognize the word more accurately using the word vector on a phoneme basis and the language model for the word, which is the current recognition target, together. Thus, the processor 180 may more accurately recognize the speech of the user in general.

Here, the language model may be learned as a personalized model classified for each user, and the processor 180 may recognize the user when the sound signal is received and recognize the speech using the personalized language model corresponding to the recognized user.

Each of the acoustic model or the language model described above may be a model learned using a machine learning algorithm or a deep learning algorithm, and may be configured as an artificial neural network. Learning of the acoustic model or the language model may be performed in the learning processor 130 of the AI apparatus 100 or in the learning processor 240 of the AI server 200.

The acoustic model or the language model may be stored in the memory 170 of the AI apparatus 100 or may be stored in the memory 230 of the AI server 200.

Then, the processor 180 of the AI apparatus 100 determines the intention of the user based on the speech recognition result (S505).

The determining of the intention of the user may mean recognizing the intention of the user. Further, the determining of the intention corresponding to the user's speech may mean determining the intention of the natural language corresponding to the speech. Further, the intention of the user may mean an intention corresponding to the user's speech.

The processor 180 may determine the intention of the user by generating the intention information based on the speech recognition result.

Here, the processor 180 may determine the intention of the user using an intention classifier of a natural language understanding (NLU) technique.

The intention classifier may refer to a model which projects an intention of the input speech recognition result onto a vector space, when the speech recognition result is inputted.

Here, a cluster may be formed for each intention in the vector space resulted from an output of the intention classifier. That is, there may be a plurality of intention clusters that may be classified by the intention classifier in the vector space resulted from the output of the intention classifier.

Here, when the speech recognition result is input to the intention classifier, the more the intention of the input speech recognition result and a specific intention cluster are similar, the intention classifier may project the input speech recognition result to a location adjacent to the corresponding intention cluster. Therefore, a distance between the projected location and each intention cluster means a similarity between the intention of the input speech recognition result and each intention cluster. Thus, a short distance may mean a high degree of the similarity.

Here, the intention classifier may be an artificial neural network-based model learned using the machine learning algorithm or the deep learning algorithm.

The processor 180 of the AI apparatus 100 determines whether the intention recognition is successful (S507).

Whether the intention recognition is successful may mean whether accuracy or reliability of the intention recognition exceeds a preset first reference value.

Here, the processor 180 may calculate the reliability of the intention recognition using the distance from the location to which the speech recognition result input in the vector space is projected by the intention classifier to each of the intention clusters.

Here, the processor 180 may calculate the reliability of the intention recognition using a distance from the location to which the speech recognition result input in the vector space is projected to the nearest intention cluster. This is because an intention corresponding to the intention cluster nearest to the location to which the input speech recognition result is projected may be determined to be the intention of the input speech recognition result.

Hereinafter, the distance from the location to which the input speech recognition result is projected to the nearest intention cluster may be referred to as a first cluster distance. Further, a distance from the location to which the input speech recognition result is projected to an intention cluster distant at an n-th spacing may be referred to as an n-th cluster distance. Similarly, the intention cluster distant at an n-th spacing from the location to which the input speech recognition result is projected may be referred to as an n-th cluster.

For example, as the first cluster distance is smaller, the processor 180 may calculate higher reliability of the intention recognition. Further, the processor 180 may determine whether the intention recognition is successful based on whether the calculated reliability exceeds the first reference value.

Here, the processor 180 may calculate the reliability of the intention recognition using both the first cluster distance and the second cluster distance.

For example, as the first cluster distance is smaller and the difference between the first cluster distance and the second cluster distance is larger, the processor 180 may calculate higher reliability of the intention recognition. Further, the processor 180 may determine whether the intention recognition is successful based on whether the calculated reliability exceeds the first reference value. This is because it may be seen that the difference between the first cluster distance and the second cluster distance indicates how assuredly the intention analyzer determined the intention of the input speech recognition result to be an intention that corresponds to the first cluster.

Alternatively, the processor 180 may determine whether the intention recognition is successful by determining whether the first cluster distance is smaller than a preset second reference value without explicitly calculating the reliability of the intention recognition.

Alternatively, the processor 180 may determine whether the intention recognition is successful by determining whether the first cluster distance is smaller than a preset third reference value and whether a difference between the first cluster distance and the second distance is larger than a preset fourth reference value.

If it is determined in S507 that the intention of the user is successfully recognized, the processor 180 of the AI apparatus 100 performs an operation corresponding to the determined intention of the user (S509).

For example, when the user requests specific information, the processor 180 may output corresponding information via the speaker or the display unit.

If it is determined in S507 that the user's intention recognition is failed, the processor 180 of the AI apparatus 100 obtains a user's application usage log (S511).

The application usage log may include not only an application usage log in the AI apparatus 100 but also an application usage log in an external device capable of communicating with the AI apparatus 100.

Further, the application usage log may include a type of an executed application, a content of user's manipulation for the executed application, and the like. Further, the content of the user's manipulation for the executed application may include a search history of the user, a browse history of the search result of the user, and the like.

Here, the processor 180 may obtain the application usage log before and after the user's utterance. This is because a pattern of the usage of the application before and after the user's utterance may be expected to be highly related to utterance content.

For example, when the user is running a weather application or searching weather on the Internet in a situation where the user has asked a specific question but the AI apparatus 100 did not grasp the intention of the user, the user's question is likely to be a question about the weather.

Similarly, when the user has asked a specific question while using a movie ticket booking application but the AI apparatus 100 did not grasp the intention of the user, and when the recognized word is similar to a movie title displayed in the movie ticket booking application, the user's question is likely to be a question asking for information about the corresponding movie.

Therefore, the application usage log before and after the user's utterance helps to grasp the content of the user's utterance and the intention of the utterance, and may be used as implicit feedback. Here, the processor 180 may obtain application usage log for a predetermined period from an utterance time point.

For example, the predetermined period may be determined to be a period including the utterance time point, such as a time period from 30 seconds before the utterance time point to 1 minute after the utterance time or may be determined to be a period from the utterance time point.

Here, the processor 180 may determine whether an permission to obtain the application usage log exists. Further, when the obtaining permission does not exist, the processor 180 may output a notification requesting the obtaining permission.

Then, the processor 180 of the AI apparatus 100 updates the language model using the obtained user's application usage log (S513).

The processor 180 may set a word mapping relationship or adjust a weighted value, so that the language model corrects incorrectly recognized words based on the application usage log.

For example, it is assumed that the processor 180 recognized the speech of the user using the language model and the recognition result is "two dies weather" and it is assumed that the user runs the weather application or searches "today's weather" on the Internet. In this case, the processor 180 may map the "two dies" to a "today's" for the language model or increase a weighted value of the "today's", so that the language model may recognize the "today's" rather than the "two dies" for the same speech later based on the application usage log.

In particular, the processor 180 may update the language model by mapping incorrectly recognized words to popular words in consideration of the user's dialect, intonation, and unusual word habits.

Here, the setting of the mapping relationship of the words and the adjusting of the weighted value in the language model may mean word embedding learning.

The processor 180 may compare the recognition result of the language model with the application usage log to determine whether the application usage log is related to the utterance of the user. Further, the language model may only be updated when it is determined that the application usage log is relevant to the utterance of the user.

Here, the processor 180 may extract a keyword to be used for the language model update from the application usage log based on the recognition result of the language model and the application usage log. Further, the processor 180 may find a word (or keyword) corresponding to the extracted keyword among the recognition results from the language model, map the corresponding word found to the extracted keyword for the language model, or increase a weighted value of the extracted keyword. In addition, the processor 180 may increase a weighted value of each of words having pronunciation similar to that of the extracted keyword.

The processor 180 may update the language model for each user.

The updated language model may be used to recognize future speech of the user.

As described above, the language model may be used to recognize the user's speech, and may determine a word corresponding to the speech from the recognition result on a phoneme basis. However, the speech recognition performance of the general language model may deteriorate due to poor pronunciation, habit, or dialect of the user. However, a language model specific to an utterance feature may be constructed for each user by obtaining the implicit feedback for a situation where the speech recognition fails based on the user's application usage log and updating the language model for each user based on the implicit feedback.

Figure 6:
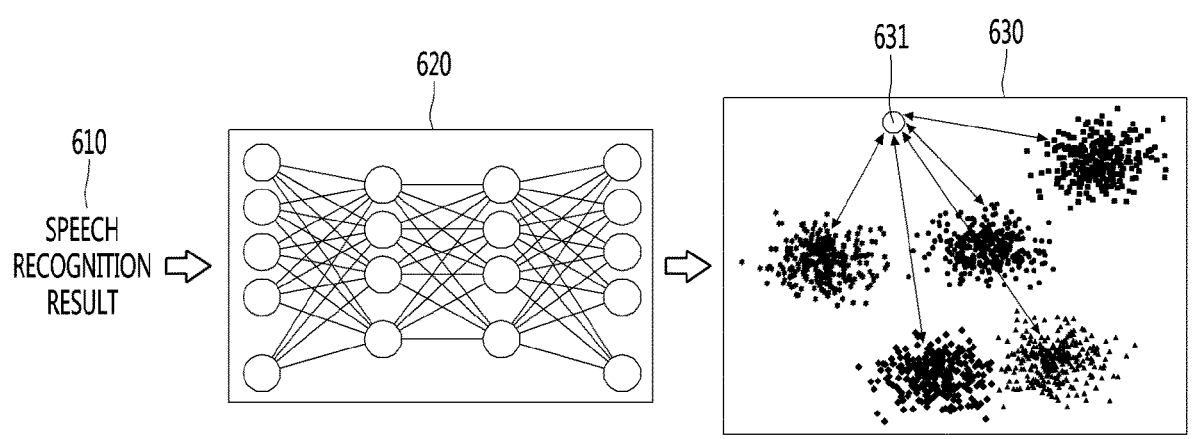
FIG. 6 is a diagram illustrating a process of determining whether user's intention recognition is successful, according to an embodiment of the present invention.

FIG. 6 is a diagram illustrating a process of determining whether user's intention recognition is successful, according to an embodiment of the present invention.

Referring to FIG. 6, the processor 180 of the AI apparatus 100 may determine whether the user's intention recognition is successful from a speech recognition result 610 using an intention classifier 620 of the natural language understanding technique.

As described above, when the speech recognition result is input, the intention classifier 620 may project the intention from the speech recognition result 610 input onto a vector space 630. Further, a plurality of intention clusters that may be classified by the intention classifier 620 may exist in the vector space 630.

As shown in FIG. 6, when the intention classifier 620 projects the speech recognition result 610 a location 631 away from all the intention clusters in the vector space 630, the processor 180 may calculate reliability of the intention recognition at a low level and thus determine that the recognition of the intention has failed.

Figure 7:
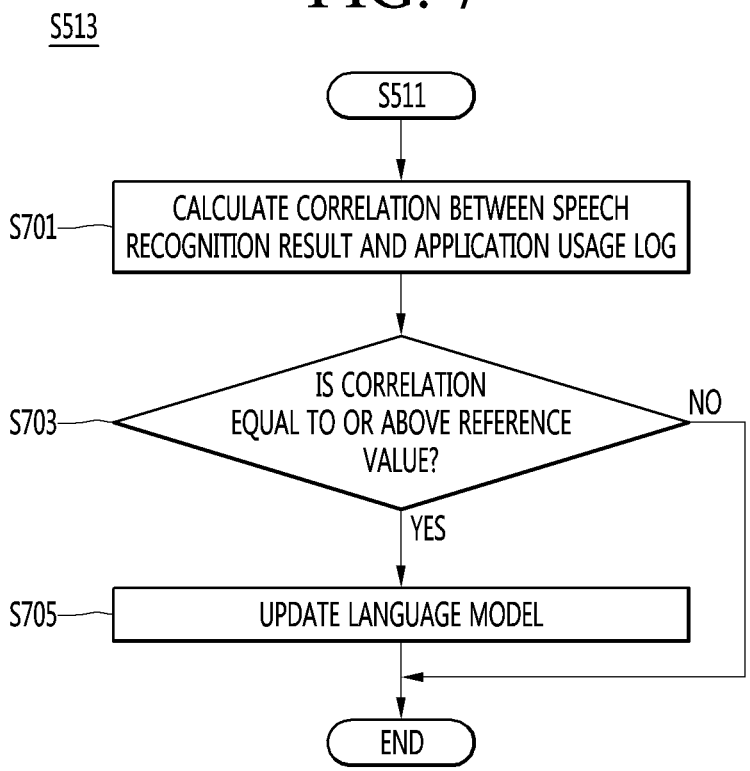
FIG. 7 is a flowchart illustrating an example of updating of a language model (S513) shown in FIG. 5

FIG. 7 is a flowchart illustrating an example of updating a language model (S513) shown in FIG. 5.

Referring to FIG. 7, the processor 180 of the AI apparatus 100 calculates correlation between the speech recognition result and the application usage log (S701).

Even though the AI apparatus 100 does not correctly determine the intention corresponding to the user's speech, the user may show a pattern of the usage of the application, which is not related to the speech.

Accordingly, the processor 180 may calculate the correlation between the user's application usage log and the speech recognition result to determine whether the application usage log may be used to update the language model.

Here, the correlation between the speech recognition result and the application usage log may mean a similarity between the speech recognition result and the application usage log.

Here, the processor 180 may determine a similarity of pronunciation and meaning between words or keywords included in the speech recognition result and words or keywords included in the application usage log, and may calculate the correlation between the speech recognition result and the application usage log based on the similarity of the pronunciation and meaning.

The words or keywords included in the application usage log may include a keyword indicating a type and a name of the application included in the usage log, a keyword indicating information contained in the application, and the like.

Further, the processor 180 of the AI apparatus 100 determines whether the calculated correlation is equal to or above a preset reference value (S703).

When it is determined in S705 that the calculated association is equal to or above the preset reference value, the processor 180 of the AI apparatus 100 updates the language model (S705).

In calculating the correlation between the speech recognition result and the application usage log in S701, the processor 180 may determine a mapping relationship between the keyword of the speech recognition result and the keyword of the application usage log, and then the processor 180 may update the language model based on the determined mapping relationship.

As a result of the determination in S705, a procedure is terminated without updating the language model.

Figure 8:
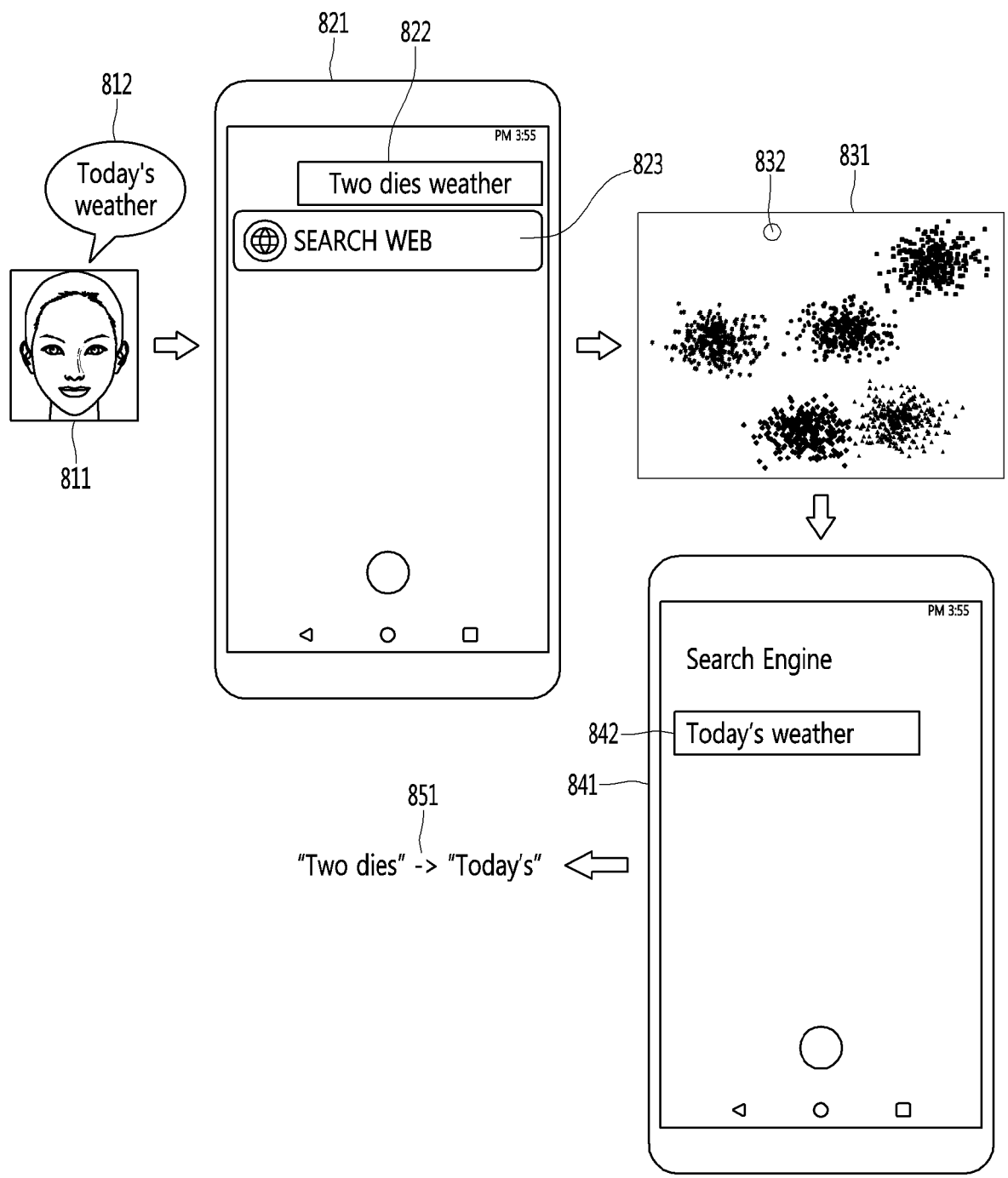
FIGS. 8 and 9 are diagrams illustrating a method for recognizing speech of a user according to an embodiment of the present invention.
Figure 9:
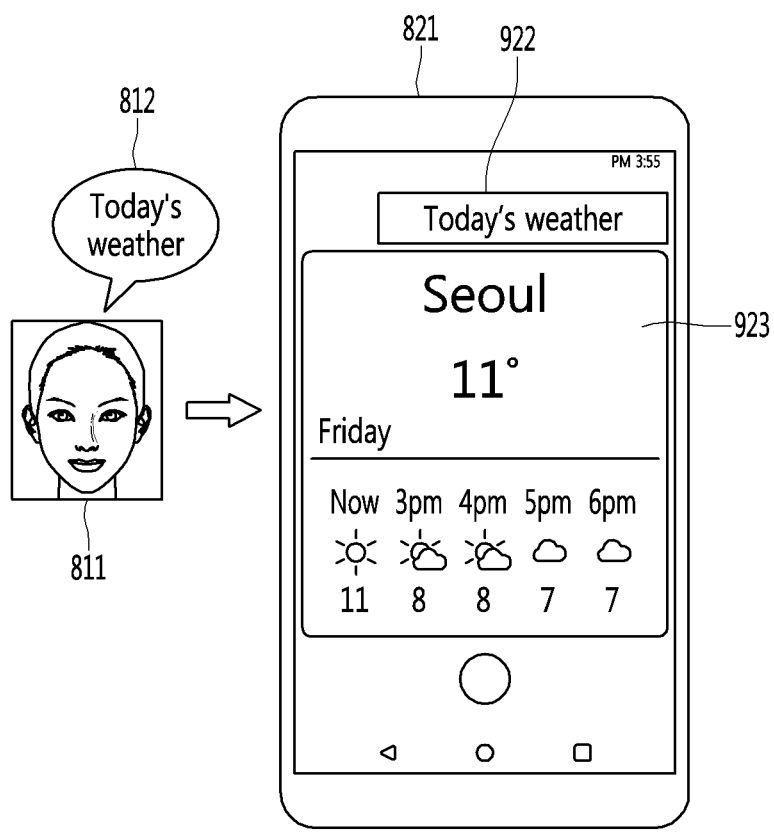

FIGS. 8 and 9 are diagrams illustrating a method for recognizing speech of a user according to an embodiment of the present invention.

Referring to FIG. 8, the user 811 may give speech utterance 812 "Today's weather" to the AI apparatus 821 to ask about today's weather. However, the processor of the AI apparatus 821 may incorrectly recognize the user's speech utterance 812 as "Two dies weather" (822). Thus, the processor may fail to grasp the intention of the user and suggest the user to search the web 823.

For example, when the user 811 is an English speaker or an Australian speaker, a pronunciation of the "Today" becomes similar to that of "Todai". Therefore, the "Today's" may be recognized as "Two dies" when an acoustic model and a language model based on English pronunciation of American speaker are used.

The processor of the AI apparatus 821 may use the intention classifier to determine that the speech recognition result 822 in the vector space 831 is spaced apart from all the intention clusters. Thus, the processor may determine that the intention recognition has failed.

When the user 811 searches 842 for "Today's weather" on a search engine using the terminal 841, the processor of the AI apparatus 821 may map 851 the "Two dies" to "Today's" using this application usage log, and update the language model based on this mapping relationship. Here, the terminal 841 may be the same device as the AI apparatus 821, but may be a separate device that is different from the AI apparatus 821.

FIG. 9 illustrates a process of recognizing speech of a user after a language model is updated according to FIG. 8.

Referring to FIG. 9, when a user 811 gives the speech utterance 812 of the "Today's weather", which is the same as above, even when the acoustic model of the AI apparatus 821 recognizes pronunciation on a phoneme basis as before, the updated language model may recognize 922 the user's speech utterance 812 as "Today's weather" instead of "Two dies weather". Accordingly, the AI apparatus 821 may provide the user with current weather information 923.

According to an embodiment of the present invention, the above-described method may be implemented as a processor-readable code in a medium where a program is recorded.

What is claimed is:

1. An artificial intelligence (AI) apparatus for recognizing speech of user, comprising:
a transceiver configured to transmit and receive data with an external device;
a memory;
a microphone; and
a processor configured to:
execute an application installed in the AI apparatus,
receive, via the microphone, a sound signal corresponding to speech of the user while the application is executed,
recognize the speech from the received sound signal using a language model stored in the memory,
determine an intention of the user based on the recognition result,
obtain an application usage log of the user when the determination of the intention is not successful, wherein the application usage log of the user includes a first usage log indicating which application is being executed at a time when the sound signal corresponding to speech of the user is received, a second usage log indicating separate applications executed on the external device and received from the external device via the transceiver, and a type of the executed application and an operation content of the user for the executed application, wherein the operation content includes a search history of the user and a browsing history of a search result of the user, and
update the stored language model using the obtained application usage log of the user.

2. The AI apparatus of claim 1, wherein the processor is further configured to update the stored language model by:
comparing the recognition result based on the stored language model with the obtained application usage log of the user to extract a first keyword for updating the stored language model based on the application usage log of the user; and
updating the stored language model based on the extracted first keyword.

3. The AI apparatus of claim 2, wherein the processor is further configured to:
extract a second keyword corresponding to the extracted first keyword from the recognition result, wherein the update of the stored language model is further based on mapping the extracted second keyword to the extracted first keyword for the stored language model.

4. The AI apparatus of claim 1, wherein the processor is further configured to:
determine reliability of the determination of the intention; and
determine whether the determination of the intention is successful based on the determined reliability.

5. The AI apparatus of claim 1, wherein the processor is further configured to:
project the recognition result onto a vector space using an intention classifier,
wherein the determination of the intention of the user is determined by comparing a location of the projected recognition result with respective locations of a plurality of intention groups included in the vector space.

6. The AI apparatus of claim 5, wherein the processor is further configured to determine the intention of the user as an intention corresponding to a nearest intention group from the location of the projected recognition result among the plurality of intention groups.

7. The AI apparatus of claim 6, wherein the processor is further configured to determine reliability of the determination of the intention higher as a distance from the location of the projected recognition result to the nearest intention group is smaller.

8. The AI apparatus of claim 6, wherein the processor is further configured to determine that the determination of the intention is successful when a distance from the location of the projected recognition result to the nearest intention group is lesser than or equal to a preset reference value.

9. The AI apparatus of claim 1, wherein the processor is further configured to:
determine whether a permission to obtain the application usage log of the user exists; and
output a notification to acquire the permission when the permission does not exist.

10. A method for recognizing speech of a user, the method comprising:
executing an application installed in an artificial intelligence (AI) apparatus;
receiving a sound signal corresponding to the speech of the user while the application is executed;
recognizing the speech from the received sound signal using a language model;
determining an intention of the user based on the recognition result;
obtaining an application usage log of the user based on a determination that the intention is not successful, wherein the application usage log of the user includes a first usage log indicating which application is being executed at a time when the sound signal corresponding to speech of the user is received, a second usage log indicating separate applications executed on an external device and received from the external device via the transceiver, and a type of the executed application and an operation content of the user for the executed application, wherein the operation content includes a search history of the user and a browsing history of a search result of the user; and
updating the language model using the obtained application usage log.

11. A non-transitory machine readable storage medium having a program stored therein, wherein the program is configured for performing a method for recognizing speech of a user, the method including:
executing an application installed in an artificial intelligence (AI) apparatus;
receiving a sound signal corresponding to the speech of the user while the application is executed;
recognizing the speech from the sound signal using a language model;
determining an intention of the user based on the recognition result;
obtaining an application usage log of the user when the determination of the intention is not successful, wherein the application usage log of the user includes a first usage log indicating which application is being executed at a time when the sound signal corresponding to speech of the user is received, a second usage log indicating separate applications executed on an external device and received from the external device via the transceiver, and a type of the executed application and an operation content of the user for the executed application, wherein the operation content includes a search history of the user and a browsing history of a search result of the user; and updating the language model using the obtained application usage log.

\* \* \* \* \*